(12) United States Patent
Tormasov

(10) Patent No.: US 7,886,016 B1
(45) Date of Patent: Feb. 8, 2011

(54) DISTRIBUTED TRANSACTIONAL NETWORK STORAGE SYSTEM

(75) Inventor: Alexander Tormasov, South San Francisco, CA (US)

(73) Assignee: Parallels Holdings, Ltd. (BM)

( * ) Notice: Subject to any disclaimer, the term of this patent is extended or adjusted under 35 U.S.C. 154(b) by 1988 days.

(21) Appl. No.: 10/293,196

(22) Filed: Nov. 13, 2002

Related U.S. Application Data

(63) Continuation of application No. 10/193,830, filed on Jul. 11, 2002, now abandoned.

(60) Provisional application No. 60/304,655, filed on Jul. 11, 2001.

(51) Int. Cl.
*G06F 11/00* (2006.01)
*G06F 15/167* (2006.01)
*G06F 15/16* (2006.01)

(52) U.S. Cl. .................. 709/213; 709/218; 709/245; 714/4

(58) Field of Classification Search .............. 714/4, 714/43; 709/203, 213, 218, 201, 236, 245
See application file for complete search history.

(56) References Cited

U.S. PATENT DOCUMENTS

| | | | | |
|---|---|---|---|---|
| 5,555,404 | A * | 9/1996 | Torbjørnsen et al. | 707/202 |
| 6,101,558 | A * | 8/2000 | Utsunomiya et al. | 710/6 |
| 6,119,005 | A * | 9/2000 | Smolik | 455/436 |
| 6,167,446 | A * | 12/2000 | Lister et al. | 709/223 |
| 6,366,907 | B1 * | 4/2002 | Fanning et al. | 707/3 |
| 6,446,218 | B1 * | 9/2002 | D'Souza | 714/4 |
| 6,543,001 | B2 * | 4/2003 | LeCrone et al. | 714/6 |
| 6,606,643 | B1 * | 8/2003 | Emens et al. | 709/203 |
| 6,611,859 | B1 * | 8/2003 | Kohno | 709/203 |
| 6,662,307 | B1 * | 12/2003 | Sipple et al. | 714/2 |
| 6,760,763 | B2 * | 7/2004 | Jennings et al. | 709/224 |
| 6,789,076 | B1 * | 9/2004 | Dutta | 707/5 |
| 6,952,737 | B1 * | 10/2005 | Coates et al. | 709/229 |
| 7,065,537 | B2 * | 6/2006 | Cha et al. | 707/202 |
| 2003/0037094 | A1 * | 2/2003 | Douceur et al. | 709/201 |
| 2004/0030778 | A1 * | 2/2004 | Kronenberg et al. | 709/224 |
| 2005/0132137 | A1 * | 6/2005 | Toombs et al. | 711/115 |

OTHER PUBLICATIONS

Shamir, Adi, "How to Share a Secret", Nov. 1979, ACM, Communications of the ACM, vol. 22 No. 11, pp. 612-613.*

Rabin, Michael O., "Efficient Dispersal of Information for Security, Load Balancing, and Fault Tolerance", Apr. 1989, Association for Computing Machinery, Journal of the Association for Computing Machinery, vol. 36 No. 2, pp. 335-348.*

* cited by examiner

*Primary Examiner*—Wing F Chan
*Assistant Examiner*—Brian J Gillis
(74) *Attorney, Agent, or Firm*—Bardmesser Law Group

(57) ABSTRACT

The present invention provides a highly scalable system for fault tolerant distributed data file storage over a set of functionally equal network servers linked through a local network with network servers and client computers. Data files are represented as a set of transactional records, each record is disassembled into redundant, functionally identical data pieces with original file reassembly dependent only upon the number of data file pieces and not on the presence or absence of any particular data file piece. Local algorithms generate unique data file identifiers upon file creation and disassembly. Changes to the data file storage system are ranked by creation time and stored as separate records with unique transaction identifiers in addition to unique data file identifiers. A transactional data file record is stored by disassembling the transactional file into pieces placed at the network servers. Low-level transactional files are collected to reassemble the data file contents.

49 Claims, 7 Drawing Sheets

DISTRIBUTED TRANSACTIONAL NETWORK STORAGE SYSTEM

REFERENCE TO RELATED APPLICATIONS

This application is a Continuation of prior application Ser. No. 10/193,830, filed on Jul. 11, 2002, now abandoned.

This application claims the benefit of U.S. Provisional Application for Patent No. 60/304,655 titled "Distributed Transactional Network Storage of High Scalability Meant for Storage of Information in a Local Network with Common Namespace, Guaranteed Access Level and No Dedicated Server" filed on Jul. 11, 2001 for priority under 35 U.S.C. §119 (e), is related thereto, and the subject matter thereof is incorporated herein by reference in its entirety.

FIELD

The system and method of the present invention relates to a distributed transactional network data storage system. More particularly, this invention relates to highly scalable distributed transactional network storage of information or data in a computer network with a common namespace, guaranteed access level and no dedicated server.

BACKGROUND

The problem of network data file storage began when computers were first linked together. Traditionally, one solution to the problem of storing data has been to allocate services to a network computer or file server [See Distributed Operating Systems by Andrew S. Tanenbaum; 1994 Prentice Hall; ISBN:0132199084]. Software, installed at other network client computers, permitted access to various network servers by copying the files of the network servers locally or by emulating access to files on network servers from a virtual local disk. FIG. 1 illustrates one prior art method for shared access to a file at a file server 10 as developed for personal DOS-based IBM compatible computers. Client software for DOS-based IBM compatible computers, if properly connected to the local network 20 and the corresponding file server 10, permitted viewing of the network drive. Software running on client computers 30 made files located at a remote file server 10 appear to be local. Thus, the allocation of services to a network computer or file server requires a dedicated file server and the client-server access model in order to access network files. [See CHARLES CROWLEY, OPERATING SYSTEMS: A DESIGN-ORIENTED APPROACH (Irwin, 1997) ISBN 0256151512].

This allocation of services to a network computer or file server has several disadvantages. In the case of shared access, several clients may view the same data file locally at the client computer. Users of client computers may be unaware of the shared access to a data file and start writing pseudo-local files which are stored to the same location. The result is file distortion. Multiple failures are bound to occur. Because pseudo-local files are physically located at the same network server, the pseudo-local files are entirely dependent on that network server. This means that any hardware, software or network failure at that network server makes file access impossible. Even properly functioning network servers may cause such a problem while rebooting their operating system. Any scheduled reboot of an operating system inevitably blocks data file access and service.

Clustering is one solution to the problem of file distortion or inability to gain access to data files. Digital Equipment Company (DEC) developed and implemented a well-known hardware and software concept in the field of clustering. Specifically, clustering is the creation of a special disk array linked up to several computer processor units. [See Roy G. Davis, VAXcluster Principles (Digital Press) ISBN 1555581129]. When a special disk array is linked up to several computer processor units, special task hardware, not a normal computer, provides shared access and guarantees absolute interchangeability of all participating computers. Being less complex, clustering hardware provides higher reliability in comparison to a standalone computer. However, a clustering configuration requires the installation of corresponding software on all of the operating systems of the linked client computers. This method provides flexible independent client computer services, but failure of the clustering hardware again causes loss of service.

Several similar network servers, interacting with client computers, may provide identical service and data access to every client computer. Data replication at every network server together with identical service, independent of the location of the client computer and service center, may be regarded as the easiest solution to this problem. However, some inconveniences, such as complex data synchronizing processes, remain.

Another solution to the problem of file distortion or the inability to gain access to files is the creation of customized distributed data storage. Service distribution implies that all service processes of the operating system are performed at the network nodes (servers) instead of at a local computer. Such service distribution reduces response time and improves provider-to-client channel capacity. Simultaneously, this distribution solves the problem of limited single network server processor power, because, for example, a service request can be processed by a larger number of computers. All of the incoming requests are done at a larger number of network servers. Thus, network server overloading is decreased even in cases of non-parallel requests, processing on a cluster node due to request distribution. Customized distributed data storage enhances service fault-tolerance level. Specifically, when a network server fails or the network is inaccessible, a client computer may switch over to a similar network server and receive the same service. The symmetry of the network servers in the computer network determines service availability.

Such customized distributed data storage service requires distributed data storage to enforce symmetry of services provided for client computers. There is a need for the development of special-purpose distribution and storage algorithms to yield optimum distributed data storage with respect to both data content and resource requirements. Such algorithms would maintain consistent network server content at the different network servers in a computer network to provide service symmetry to client computers.

Currently available methods and algorithms for distributed data storage are complex. The data duplication or mirroring approach is frequently used, in which the server at every network node possesses a complete copy of all stored data files. Mirroring, systems of FTP servers have been arranged in such a manner, as discussed in the following references (See U.S. Pat. No. 5,835,911, Nakagawa; U.S. Pat. No. 5,434, 994, Shaheen; U.S. Pat. No. 5,155,847, Kirouac; U.S. Pat. No. 5,742,792, Yanai).

Regular network data systems, such as NFS (Network File System) [See BRIAN PAWLOWSKI, NFS VERSION 3 DESIGN AND IMPLEMENTATION (USENIX Summer 1994)] at UNIX (developed by Sun Microsystems), usually include a pre-defined network server and client computers for accessing a particular network server to obtain a necessary data file. Such network data file systems are generally used with a minimum number of network servers (See U.S. Pat. No. 5,513,314, Kandasamy, et al.).

Network distributed file systems are arranged in a more complicated manner. Such network distributed file systems generally permit users to work with the distributed file system as a whole (not with just a selected sever as in the NFS case) in a shared uniform namespace, regardless of whether a specific file server is accessible. Namespace is a collection of unique names, where a name is an arbitrary identifier, usually an integer or a character string. Usually the term "name" is applied to such objects as files, directories, devices, computers, etc.

Another approach to creating a distributed data file storage access model is the hierarchical system of file naming combined with local data caching on the client computer server. Transarc Corporation (now IBM Transarc Labs), AFS [See RICHARD CAMPBELL et al. MANAGING AFS: THE ANDREW FILE SYSTEM (Prentice Hall 1997) ISBN 0138027293] and Coda [See P. J. Braam, The Coda Distributed File System (#74, Linux Journal #50 Jun. 1998); M. SATYANARAYANAN, CODA: A HIGHLY AVAILABLE FILE SYSTEM FOR A DISTRIBUTED WORKSTATION ENVIRONMENT (Proceedings of the Second IEEE Workshop on Workstation Operating Systems September 1989)] systems are examples of such distributed data file storage systems. For optimal data access, these distributed data file storage systems intensively cache data at the local file system of a client computer and fully utilize this cache to reduce the number and size of requests to the system file server.

AFS transmits all of the data file requests to the system file server (even files within the cache of a local data file system) but permits access to the data file requests only after it is determined that the data files were not altered after the copying process was finished. In case of file server disconnection, AFS usually does not allow data file access. Coda, in contrast, assumes that such data files tend to stay intact, and permits working on these data files without complete recovery of the file server connection. The fault tolerance level under this approach is higher than with the regular use of pre-defined network servers, which requires being permanently online. However, such an approach permits several client computers to concurrently access the same data file, with the potential for errors.

Both the AFS and the Coda approaches cache entire data files and possess multiple file copies with various modifications. The possession of multiple file copies with various modifications complicates the efficiency of file system support for data coherence. Moreover, access to data files outside the cache is possible only after those data files have been fully loaded to the cache. Thus, in the model when different data is stored at different servers, data accessibility levels can be susceptible to failure in case of a server disconnection.

Namespace of these AFS and Coda file systems is hierarchical; that is, it stems from a shared point, i.e., the root of a data file system. Nevertheless, every AFS/DFS/Coda name corresponds to a specific file server. Loss of a specific file server results in loss of access to certain data files. When this occurs, data files get split apart. A special function is used to search the namespace, recognize the server, and access the data files. Thus, potential file interchangeability exists, for example, by direct substitution of a data file which is not found by another file. But, even if properly organized, such a system does not offer any improvement in fault tolerance level.

Distributed access to data files may also be achieved by a distributed storage of network data blocks, rather than distributed storage of entire data files. In this approach, the file system is built over such a set of network data blocks. The server software emulates a powerful virtual low-level disk which is accessible by software running on the client's computer. A regular data file system is built up over the storage of network data blocks as if it was working with a local disk. If there is a need to synchronize records in the same network data blocks, e.g., when two independent client computers request write access to the directory, special locking algorithms would be required. Such a distributed data storage system would be rather expensive with respect to both scalability and efficiency.

Another method of data storage distribution, RAID Level 5 [See GREGORY F. PFISTER, IN SEARCH OF CLUSTERS (Prentice Hall 1998) ISBN 0138997098], allows data acquisition even if a server or disks containing data are not accessible. RAID Level 5 is extensively used to deliver higher fault-tolerance efficiency of data files stored on disk. Using a similar algorithm, the Serverless File System [See TOM ANDERSON et al., SERVERLESS NETWORK FILE SYSTEMS (15th Symposium on Operating Systems Principles, ACM Transactions on Computer Systems 1995)] was developed at UC-Berkeley. The Serverless File System uses a group of network servers rather than a single dedicated server. The Serverless File System is based on distributed storage of data blocks, wherein a RAID algorithm can successfully restore every data block (stopping at most one server at a time). According to the Serverless File System, the file system asymmetrically divides supporting data blocks between different network servers and possesses two different states: a normal state when all the network servers are accessible, and a failure state when a special recovery procedure is required for an unavailable network server. The system does not allow use of network servers with unequal efficiency and connection quality, since data accessibility depends on access to all of the network servers.

All file system developers inevitably come across the problem of dynamic file content changes. It is well known that almost all data storage files eventually require some content changes. Various methods of changing data file content have been proposed to solve this problem. The most common method of providing for content changes in data storage files includes changing the file content at the file location, i.e. in the file system. Most of the old MSDOS and UNIX operating systems are arranged in such a manner. Changing the data file content at the location of the file has certain disadvantages, since any errors made during file recording can influence the content of the data file. For instance, if the computer stops working while a data file is being recorded, the file will be irreparably damaged or irretrievably lost. Thus, it is preferable to have an operating system with unmodifiable files of a fixed size and location.

To solve the data file modification problem, some systems support different versions of the same file. VAX VMS file system [See KIRBY MCCOY, VMS FILE SYSTEM INTERNALS (Digital Press 1990) ISBN 1555580564)] records every data file modification as a whole data file under a new name, while keeping the previous version of that data file accessible. Then every data file modification, or version, is sent to the data file directory. The data file versions share the same data file name, but differ in data file numbering, temporarily ranked during the process of data file modification. FIG. 4 illustrates prior art data file storage 90 with the form versions 100 ranked by time. The new version 110 goes in full to data storage 120 after the file has been edited 130. Of course, this method of data storage yields numerous, virtually redundant, data file copies. Moreover, this data file modification method is very inefficient in that the operating system first reads the final file modification and then saves it to a new location, thus requiring disk space and disk I/O bandwidth nearly equal to the size of a doubled file.

Recording all changes to a data file in a special journal is another potential solution to the problem of data file system development. As later discussed, this technique was developed for databases to assure data safety and accessibility to data files in case of system failure. In this approach, changes to a data file are recorded in a special standard form usually called a log. From that log, records are gradually put into the current data file. FIG. 3 illustrates the process by which discrete changes 80a, 80b and 80c to the original data file are entered in the log, and then step-by-step copied to file 60. Such a transactional method reveals either all the changes to a data file or none of them, with no intermediate positions. The log contains a detailed indivisible stream of structured changes to every file. Data file systems based on this method are characterized by fast failure recovery. Changes to the data file system are highly coherent, and it is not necessary to check all available data to assure data file system consistency. This method, however, does not permit recording variances, as contrasted with an undo/redo log recording database technique.

What is needed is a fault tolerant data storage system which will optimize distributed data storage with respect to both data content and resource requirements. The same content should be available at different servers in order to provide client computer symmetry and promote data synchronization.

SUMMARY

The present invention provides a system and method for fault tolerant distributed data file storage over a highly scalable set of functionally equal network servers which will optimize distributed data storage with respect to both data content and resource requirements. Specifically, the same data content is available when accessing different network servers to provide client computer symmetry. The network servers are linked through a client-server model via a local computer network, wherein each network server supports some set of network services and is ranked according to available capacity and accessibility.

The highly scalable distributed transactional network data storage system of the present invention functions at the data file level, with a data file being the information unit for both the network server and the user of the data storage file. According to the present invention, special file disassembly/assembly procedure is introduced. Data file disassembly assures data availability, with a data file being disassembled into redundant, functionally identical data file pieces. Data file reassembly is dependent only upon the number of data file pieces and not on the presence or absence of any data file piece in particular. A set of data file pieces is stored at a set of separate network servers. Initial data redundancy and functional equality of data file pieces assures that data file reassembly is independent of access to any particular network server. The highly scalable distributed transactional network storage system of the present invention utilizes strictly local algorithms which control network server selection for connection to local client computers, selecting the network server which is least loaded and most accessible.

Organization of the data file storage system is based upon two file classes: regular data files and directory files containing directory and other possible data necessary for translation of a data file pathway. The regular data files utilize common namespace which is accessible via typical data file pathname. The directory file is used for translation of file requests originated from local client computers from logical data file names to internal unique data file identifiers. The totally local algorithms generate unique data file identifiers upon data file creation and disassembly.

The fault tolerance level is determined by the degree of redundancy which is built into the running system. The predetermined data file piece redundancy volume is based upon prospective data file stability. In the present invention, changes to every data file are stored as separate records with unique transaction identifiers in addition to the unique data file identifiers.

The implementing software, constructed and arranged to run on client computers and for enabling such data file storage, consists of two subsystems: one subsystem for the computer's local data file system, and the other subsystem for the distributed data network. Changes to a data file are recorded to a local data storage file, including the time it was recorded. The software running on a local client computer generates a transaction identifier and a separate low-level data file to store all of the data file changes and make a transactional record. The transactional record is recorded by disassembling the low level data file into pieces which are stored at the network servers by the network part of local client software.

The software on the local client computer records any attempt from the local operating system processes to read the data file from network storage and sends a request to any network servers to locate this file. If this data file exists and has a unique data file identifier as determined by the directory service, the software on the local client computer requests the storage file data and obtains the list of the data file transactions for a period of time. Then the software running on the local client computer receives the piece of the data file associated with these transactions and collects the low-level transactional files in order to assemble the original contents of the data file. The local operating system where the software running on the local client computer is installed continues working with the assembled file as if the file had always existed there.

BRIEF DESCRIPTION OF THE DRAWING FIGURES

A better understanding of the distributed transactional network storage system and method of the present invention may be had by reference to the drawing figures wherein.

DESCRIPTION OF THE EMBODIMENTS

The present invention relates to a highly scalable distributed transactional network storage system and method, which is intended for storage of information or data in a local network with a common namespace, guaranteed access level, and no dedicated network servers.

Local network as used herein means a regular local computer network installed at an office or at a data center. Such a regular local computer network usually consists of several standard network servers that are completely interchangeable with respect to service functioning. Access to network servers is based on a regular client-server model, i.e., the software installed on a local client computer provides access to the data storage files through connection to one of the network servers. All the network servers are equal in rights as far as data file request processing is concerned, i.e., to obtain information, the local client computer may link to any network server, selecting the one which is least loaded and most accessible. The set of network servers connected via the local network is called a cluster.

Figure 1:
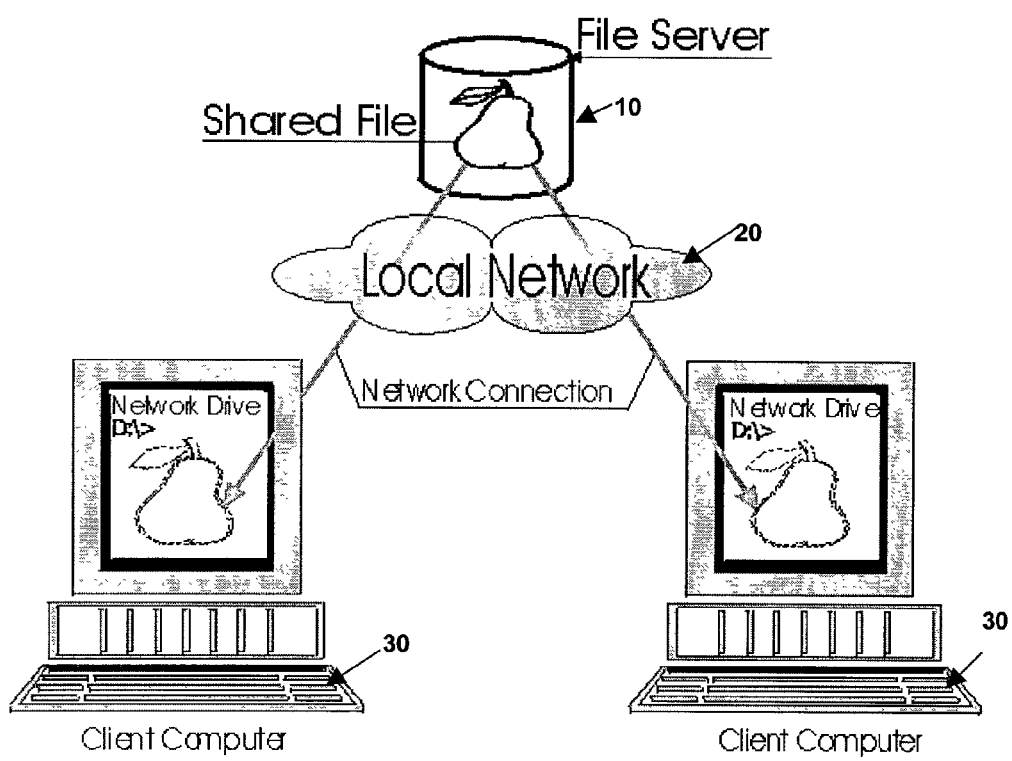
FIG. 1 is a schematic illustration of a prior art method to provide split access to a data file located at a network file server.
Figure 2:
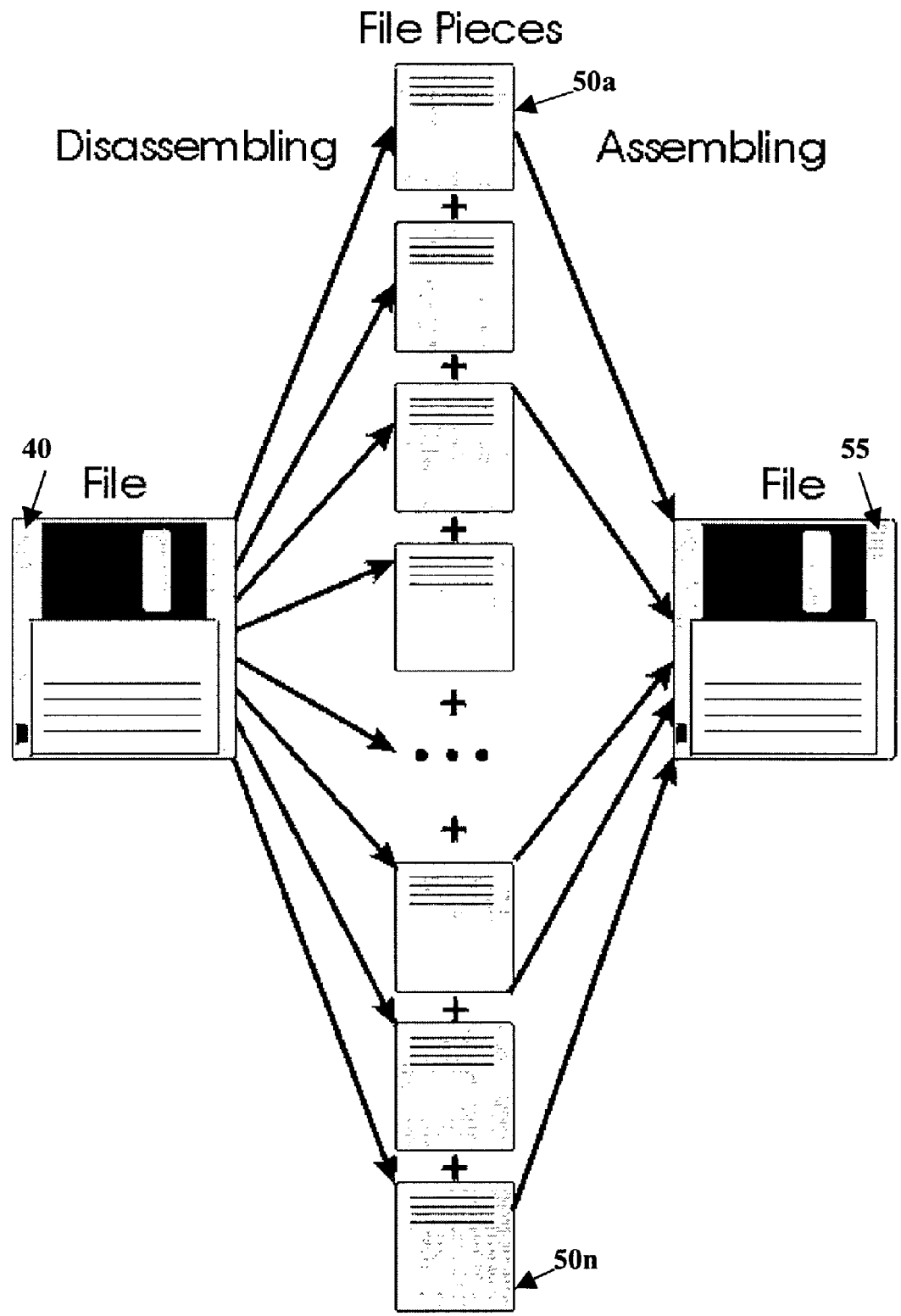
FIG. 2 is a schematic illustration of data file disassembly into redundant pieces and assembly of the original from a certain number of data file pieces.
Figure 3:
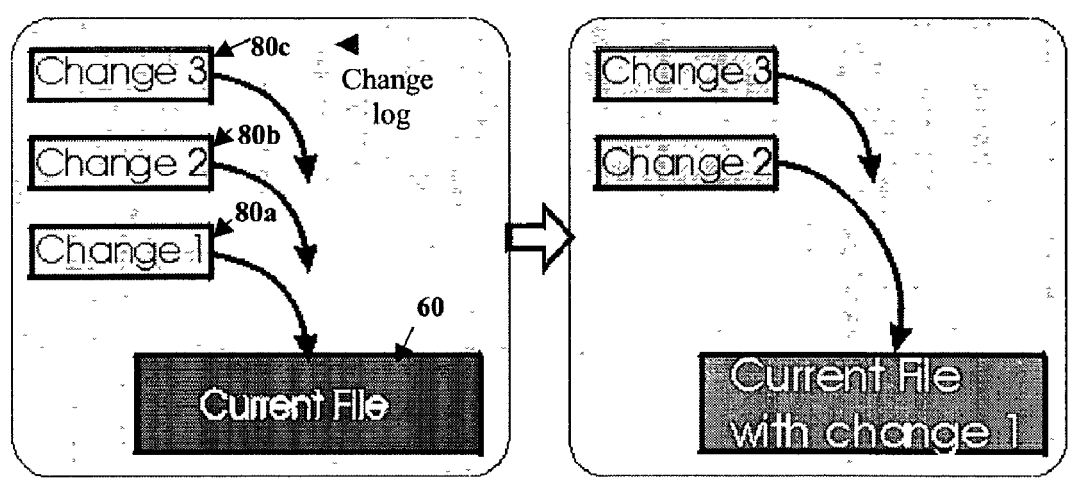
FIG. 3 is a schematic illustration of the prior art storage method of step-by-step data file changes in the log and their further recording into the original data file.
Figure 4:
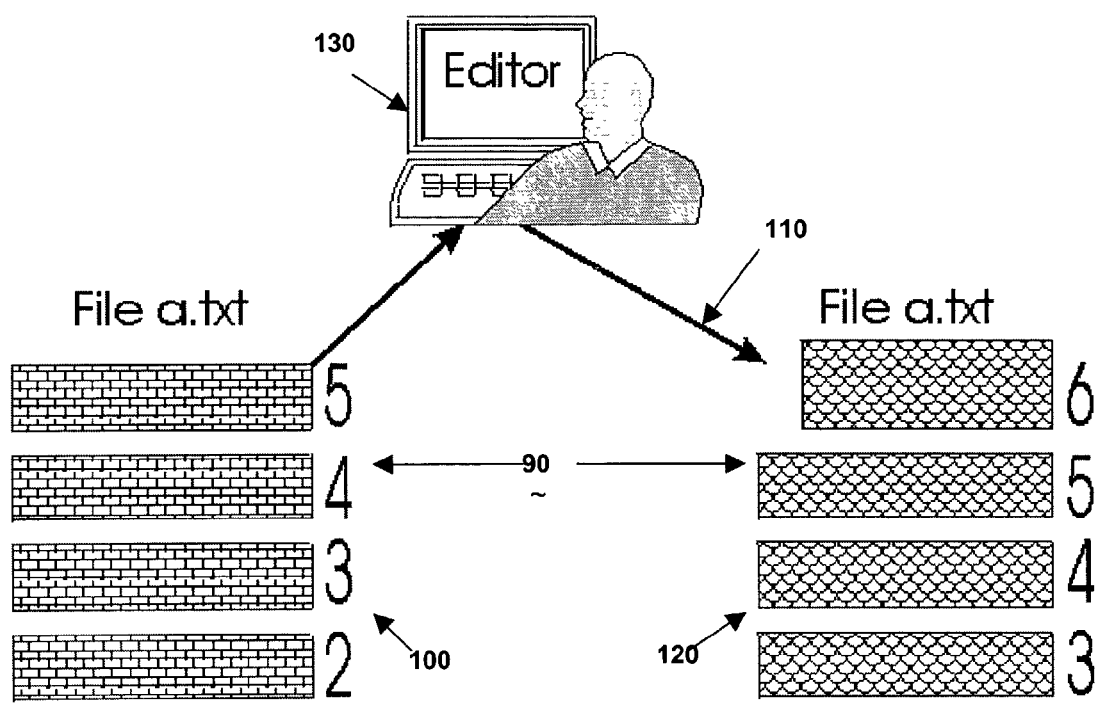
FIG. 4 is a schematic illustration of prior art data file storage in the form of versions ranked by order of creation where the new version (6) goes in full to the storage after the data file has been edited, while some old version (2) can be purged out of storage.

The highly scalable distributed transactional network storage system of the present invention functions at a data file level, i.e., a data file represents the information unit for both the network server and the user of the stored data. The data availability level is guaranteed by the data file disassembly/assembly procedure. A data file destined for storage is first disassembled into pieces in such a way as to be later re-assembled from these data file pieces in the future. Technically, this procedure is not just a splitting of a data file from one piece into several pieces. Each data piece is formed as result of a complex generation procedure. The only requirement for these data file pieces is that there should be some assembling procedure which takes some of the generated data file pieces and then restores the original file as a whole. Assembly of a usable data file may require fewer than all of the data file pieces available. To correctly assemble the source file, the data file pieces must be functionally identical, such that proper assembly of a usable data file only depends on the number of data file pieces and not on any data file piece in particular. As shown in FIG. 2, a data file 40 is disassembled into redundant data file pieces 50a through 50n, and then properly assembled 55 from the combination of a certain number of data file pieces 50a through 50n.

In the storage process, each piece of a data file which is stored goes to one network server from a distribution server. Under these conditions, partially switching off some of the servers does not impact data accessibility if the rest of network servers contain sufficient numbers of data file pieces. Initial data redundancy assures successful assembly, and equality of data file pieces makes them independent of access to a particular network server.

The scalability and fault tolerance of such a data storage system is determined by multiple factors, particularly the algorithms which are applicable to all of the network servers. All of the algorithms, functioning in such an interconnected network server design, must be of a local nature, i.e., the system does not contain a complete list of all of its network servers. The same is true with respect to data file naming. There is no location to verify name uniqueness, as usually found in a catalogue. This method promotes successful growth and self-organization of the system, since the addition or deletion of network servers influences only the neighboring network servers, not the whole system. Thus, each network server contains and supports a dynamic list of its neighboring network servers, which is smaller than the total number of network servers and is able to evolve over time.

Figure 5:
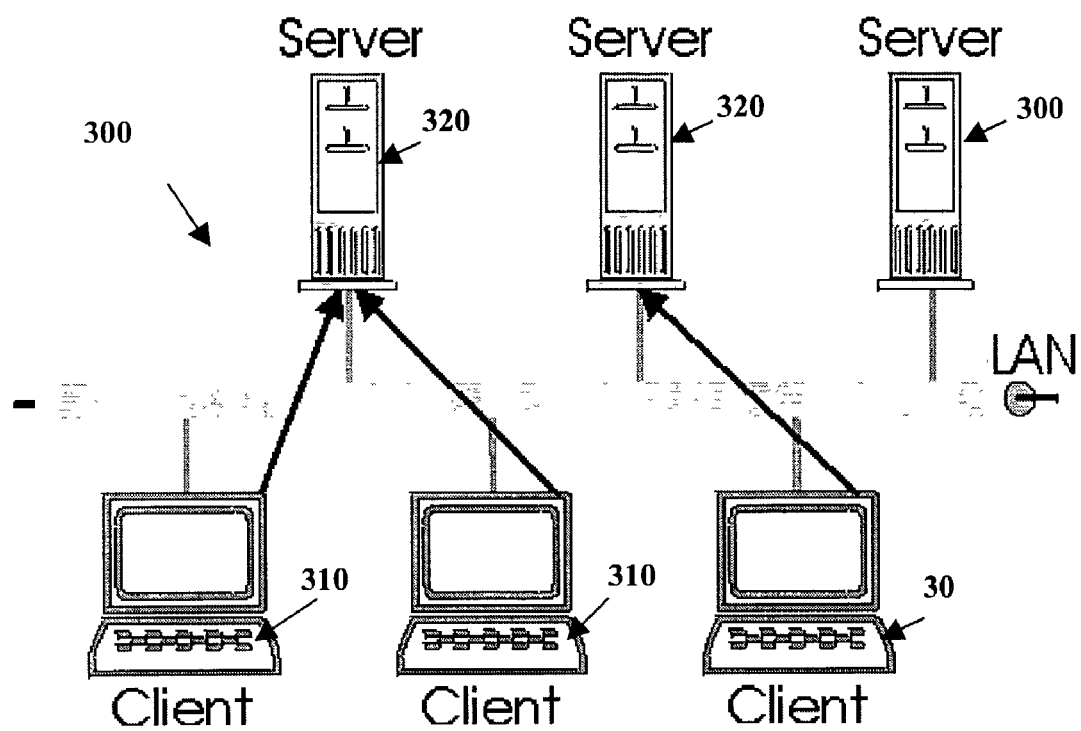
FIG. 5 is a schematic illustration of a service system with no dedicated computer.

To access the data storage system, the local client computer connects to any network server. The network servers all function identically, making data file access independent of any particular network server. FIG. 5 illustrates a service system 300 with no single dedicated network server computer, whereby the local client computer 310 is able to connect to any network server 320 to obtain any data file. The algorithm reads the loading information for the network servers 320 and selects the network server 320 which is least loaded for connection.

In order to organize the data file storage over the network server system, all of the data files are divided into two classes: regular data files, and directory files containing directory and other possible data necessary for translation of the file pathway.

For regular data files, accessible namespace which is common to all of the network servers is introduced. The client computer may access a data file by specifying its name and its path from the root directory. The path does not depend on the location of the local client computer nor the network server to which the local client computer is connected.

Namespace is a collection of unique names, where a name is an arbitrary identifier, usually an integer or a character string. [See CHARLES CROWLEY, OPERATING SYSTEMS: A DESIGN-ORIENTED APPROACH (Irwin, 1997) ISBN 0256151512]. Usually the term "name" is applied to such objects as data files, directories, devices, computers, etc. More information about typical distributed data file system name space and related problems can be found in the references that follow [See R. KUMAR, OSF's DISTRIBUTED COMPUTING ENVIRONMENT (Aixpert, IBM Corporation, Fall 1991); G. LEBOVITZ, AN OVERVIEW OF THE OSF DCE DISTRIBUTED FILE SYSTEM (Aixpert, IBM February 1992); The Distributed File System (DFS) for AIX/6000 (IBM May 1994) Doc. No. GG24-4255-00; W. ROSENBERRY, et al. UNDERSTANDING DCE (O'Reilly & Associates, Inc. September 1992)].

Using directory files information, it is possible to determine how to assemble data files which are requested by a local client computer. Directory files information helps to translate requests from a local client computer for a logical file name into the form of an internal identifier used to acquire the data file contents. This procedure is applicable to every subdirectory.

Figure 7:
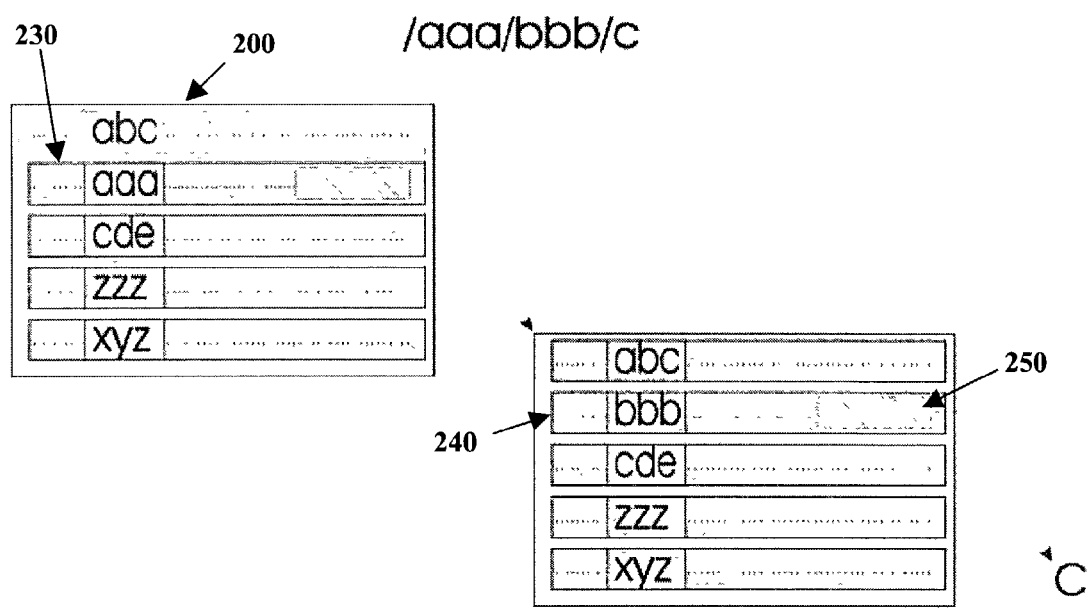
FIG. 7 is a schematic illustration of a file search procedure to locate a unique identifier by its logical name (pathname traverse procedure).

FIG. 7 illustrates the data file search procedure used to locate a unique data file identifier "C" by its logical name, according to the data file path "/aaa/bbb/c". First, the root directory file 200 must be located. Then the record corresponding with the aaa file 230 is identified and confirmed to be a pointer to a directory file 250. The same procedure takes place for the "bbb" file 240. After both procedures have been accomplished, the "C" file via pointer 250 is located.

Thus, the directory represents a set of records corresponding to data files. At a minimum, each record contains a logical file name and a unique identifier corresponding to it.

All the data files, including directory files, are viewed by the system as equal and possess unique across-cluster file identifiers for assembly. Any network server, requesting access to a directory as described above, may be considered a client computer for this directory service.

The unique data file identifier is generated at the moment a data file is created. The uniqueness of the data file identifier is derived using the totally local algorithms and does not require confirmation.

To start working with the disclosed transactional network storage system, the local client computer is connected to a network server as described above and sends out a request for a data file operation. Consider the file change recording operation (file write). First, the local client computer creates a low-level data file with changes record, then disassembles the low-level data file into data pieces and sends the data pieces to a network server. The network server sends the data file pieces to all of the network servers in the group. The neighboring network servers send the data file pieces further, until all of the data pieces are placed with a network server (with at least one data piece at each network server). During disassembly of a data file, a unique identifier is generated in order to identify the disassembled data file pieces in the future.

To read a data file, the local client computer is connected to any network server and sends a request containing the full file name with access pathname. A network server translates the data file name into a unique identifier using directory information and retrieves information about sufficient data file pieces for reassembly of all required for original data file to assembly low-level data files. The network server first checks the availability of the data file pieces, and requests the data file pieces at the other network servers if the number of data pieces is insufficient. The network server collects the data pieces required for file assembly and sends them to the requesting local client computer. Only then may the client computer assemble the original data file.

The fault tolerance level (network server accessibility depending on disconnection or network access failure) is determined by the degree of redundancy which is built into the network data storage system. Data file pieces are created in predetermined redundancy and placed at different network servers. So inaccessibility of some network servers does not influence data file assembly and accessibility to the local client computer if the overall number of accessible network servers is greater than some pre-defined number. Redundancy volume is determined at the moment the data file is stored and is dependent on the prospective stability of the data file storage.

This disclosed system and method for data storage is convenient for working with unmodified data files. The algorithm for data file storage by data pieces is very dependent on the contents of the data file. Slight changes to the data file may require changes to all of the data file pieces. Such a change to all data file pieces is expensive and inefficient.

Figure 6:
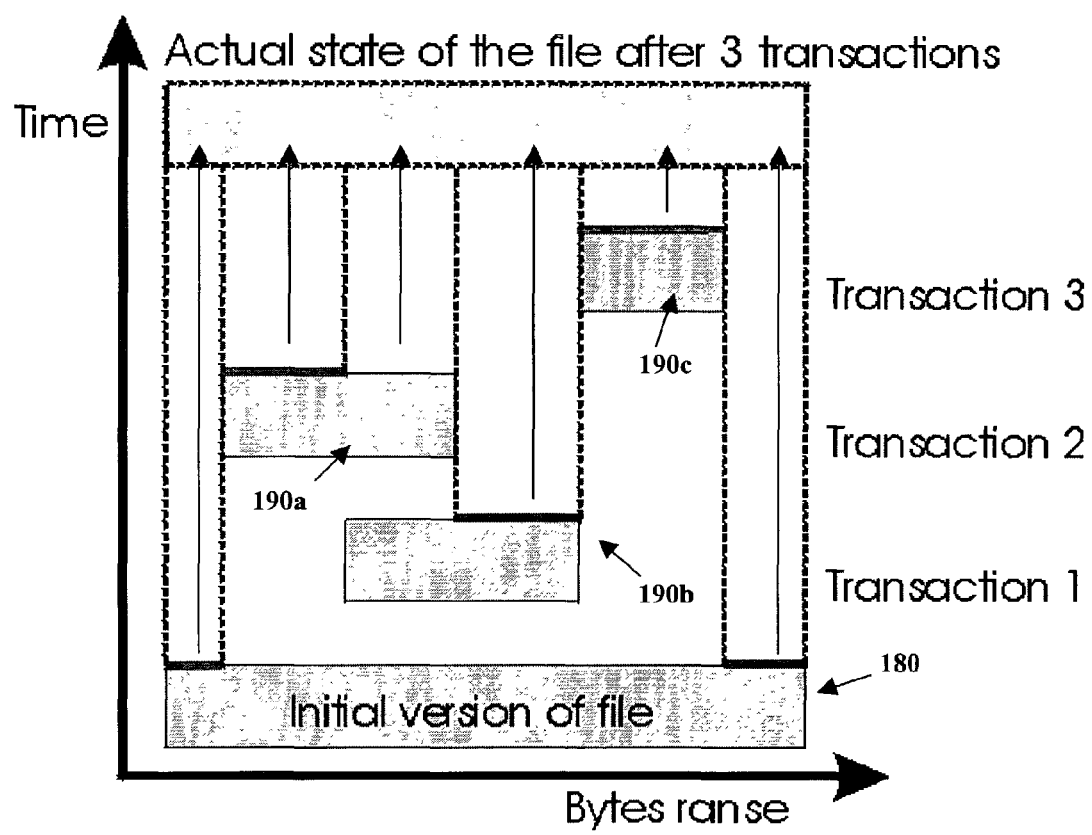
FIG. 6 is a schematic illustration of data file storage in its initial form including a set of transactional changes.

The problem of having to make changes to all data file pieces can be solved by a data file storage system which ranks data file changes in time with probable overlapping. Each change to the contents of a data file represents a set of triplets: the offset from the beginning of data file, the data length, and the data itself. Each change to the data file or metadata gets arranged in the form of a separate record. Thus, the physical data file gets stored in the form of a series of records. Each record is regarded as a low-level unmodified data file. A unique transaction identifier, introduced in addition to the unique data file identifier, distinguishes the records and possesses the property of a timing mark to establish the "before-after" relationship between the identifiers and the time of their creation. Information about the state of the data file at a particular moment in time requires the availability of all of the transactions related to that data file, with the time of creation being less than or equal to that requested. As shown in FIG. 6, the data file is stored in its initial form 180 without recording the set of transactional changes 190*a*, 190*b*, 190*c* to it. Each state of the data file is available at any point in time.

Client software for such storage consists of two elements: one part for the computer's local file system and the other for the distributed data network communications.

The software running on the local client computer records information to a local data file and saves the data about the recording, including the time it was recorded. At the time that a transaction ends, the software running on the local client computer generates a transaction identifier and a separate low-level data file to store all of the changes to the data file and make a transactional record. One transaction can contain data for different files. The transactional files are sent to the network software part of a local client computer and are recorded by disassembling the data file into data pieces which are placed at the network servers.

The software running on the local client computer hooks any attempt from the local programs and services of the local operating system to read the stored data file and sends a request to the network server to locate this data file. If this data file exists and has a unique data file identifier as determined by the directory service, the software running on the local client computer requests the storage file or files and obtains the list of the file transactions for a period of time. Then the software running on the local client computer receives the data file pieces associated with these transactions and collects the low-level transactional data files in order to assemble the original data file contents. The programs and services of the local operating system where the software running on the local client computer is installed continues working with the assembled data file at the local file system as if the data file had always existed there. Thus, the software running on the local client computer provides additional network functionality, data integrity, and accessibility to a local data file system.

While the present system has been disclosed according to its preferred and alternate embodiments, those of ordinary skill in the art will understand that other embodiments have been enabled by the foregoing disclosure. Such other embodiments shall be included within the scope and meaning of the appended claims.

What is claimed is:

1. A system of distributed file storage, comprising:
a plurality of servers providing distributed file storage to a plurality of client computers;
the servers organized into a plurality of groups, wherein the servers in each group are neighbors and communicate with each other, and wherein at least some of the servers have neighbors from more than one group and a number of servers in any group is less than the total number of servers in the system of distributed file storage;
server-side software to enable delivery of files from the servers to clients; and
a common file namespace corresponding to a tree, wherein the files include directory files and common data files within the common file namespace,
wherein access to the files stored in the distributed file storage requires access to a predetermined number of servers N from a subset of servers K to which data relating to the files has been distributed in equal-sized pieces, the pieces generated from the files using an (N,K) algorithm and distributed to the K neighboring servers of one group, such that the files can be recovered from any N out of the K servers.

2. The system of claim 1, wherein the server-side software is adapted to communicate with client-side software for obtaining the files from the distributed file storage,
wherein the client-side software stores changes to a client-side file system as a set of time-ordered transaction records, and
wherein the transaction records represent changes to the files.

3. The system of claim 2, wherein the client-side software disassembles the transaction records for storing in the distributed storage system.

4. The system of claim 3, wherein the server-side software communicates with the client-side software for recording the transactions into the distributed file storage.

5. The system of claim 3, wherein the client-side software communicates with the distributed file storage for accessing data from the distributed file storage and using the data to update a file on one of the client computers.

6. The system of claim 2, wherein the client-side software verifies that client-side file content is consistent with file content in the distributed file storage in response to client-side file access requests.

7. The system of claim 2, wherein the client-side software is located on a client computer.

8. The system of claim 2, wherein the transactions records are stored in the distributed file storage as separate files and using the (N,K) algorithm.

9. The system of claim 2, wherein the transaction records represent an offset from a beginning of a file, a data length, and a changed data.

10. The system of claim 9, wherein each change to the file or to metadata of the file is stored as a separate transaction record if the changes are not to a contiguous portion of the file.

11. The system of claim 2, wherein a list of neighbor servers of each group is stored on the servers from the group, but the distributed file system does not contain a single master list of all servers.

12. The system of claim 2, wherein each transaction has a transaction ID, the transaction ID being used for comparing a "before-after" states of the file.

13. The system of claim 1, wherein servers of the same group are ranked according to a particular server using available network bandwidth as a metric for optimizing access to the distributed file storage.

14. The system of claim 1, wherein servers of the same group are ranked according to a particular server using a network accessibility as a metric for optimizing access to the distributed file storage.

15. The system of claim 1, wherein the servers form a distributed network.

16. The system of claim 1, wherein the servers communicate directly only with servers in the same group,
wherein a server that belongs to more than one group can route information from one group to which it belongs to another group to which it belongs, and
wherein if a first server needs to deliver data to a second server that does not belong to the same group, the first server routes the data through at least one server of its own group to at least one server belonging to another groups.

17. The system of claim 1, wherein the servers are functionally equivalent such that no one server of the K servers used to store the file pieces is different from any other server, for reconstructing the file.

18. The system of claim 1, wherein, to obtain any file from the distributed storage system, the clients can use any of the servers.

19. The system of claim 1, wherein the servers communicate directly only with servers in the same group.

20. The system of claim 1, wherein a server that belongs to more than one group can route information from one group to which it belongs to another group to which it belongs.

21. The system of claim 1, wherein if a first server needs to deliver data to a second server that does not belong to the same group, the first server routes the data through at least one server of its own group to at least one server belonging to another group.

22. The system of claim 1, wherein each network server contains a dynamic list of its neighbor servers, which is smaller than the total number of network servers and evolves over time.

23. A system of distributed file storage, comprising:
a plurality of servers providing distributed file storage to a plurality of client computers;
the servers organized into a plurality of groups, wherein the servers in each group are neighbors and communicate with each other, and wherein at least some of the servers have neighbors from more than one group and a number of servers in any group is less than the total number of servers in the system of distributed file storage;
server-side software to enable delivery of files from the servers to clients; and
a common file namespace corresponding to a tree, wherein the files include directory files and common data files within the common file namespace,
wherein access to the files stored in the distributed file storage requires access to a predetermined number of servers N from a subset of servers K to which data relating to the files has been distributed in equal-sized pieces, the pieces generated from the files using an (N,K) algorithm and distributed to the K neighboring servers of one group, such that the files can be recovered from any N out of the K servers,
wherein the server-side software is adapted to communicate with client-side software for obtaining the files from the distributed file storage,
wherein the client-side software stores changes to a client-side file system as a set of time-ordered transaction records, and
wherein the client-side software is located on one of the servers.

24. A method of providing distributed file storage, comprising:
organizing a plurality of servers into a plurality of groups, the servers providing distributed file storage to a plurality of client computers,
wherein servers in each group are neighbors and communicate with each other, and wherein at least some of the servers have neighbors from more than one group and a number of servers in any group is less than the total number of servers in the system of distributed file storage;
initiating server-side software to enable delivery of files from the distributed file storage to clients; and
establishing a common file namespace corresponding to a tree, wherein the files include directory files and common data files within the common file namespace,
wherein access to the files stored in the distributed file storage requires access to a predetermined number N of servers from a subset of servers K to which data relating to the files has been distributed in equal-sized pieces, the pieces generated from the files using an (N,K) algorithm and distributed to the K neighboring servers of one group, such that the files can be recovered from any N out of the K servers.

25. The method of claim 24, further comprising ranking the servers according to a network accessibility and performance metric for optimizing the distributed file storage.

26. The method of claim 24, further comprising providing to the client computer file access through a highest ranked server.

27. The method of claim 26, wherein the step of providing the file access comprises:
  requesting, from any server, a file using its name in the common file namespace;
  requesting information about a set of file transaction records necessary for file assembly, wherein the file transaction records represent changes to the file; and
  requesting information about availability of the set of file transaction records.

28. The method of claim 27, further comprising:
  checking for a presence of the file pieces in a local cache of the client computer;
  checking for a presence of the file pieces on neighboring servers; and
  transmitting the request to non-neighboring servers if at least some of the file pieces are present on the non-neighboring servers.

29. The method of claim 28, further comprising:
  collecting a plurality of data file pieces for each transaction record;
  sending the file pieces from the requesting server to at least one client computer;
  assembling the file pieces into requested transactions using client-side software; and
  assembling the transactions into a requested file using client-side software.

30. The method of claim 24, further comprising ranking the servers according to a network performance metric for optimizing the distributed file storage.

31. The method of claim 24, wherein the step of establishing a common file namespace comprises:
  assigning a unique data file identifier to each of the directory files and the common files, wherein the unique data file identifier is unique across the servers and across client computers and is independent of any particular server;
  maintaining directory files that store directory records, the directory records including a file name/file identifier pair; and
  using the directory records to translate file pathname within the common file namespace into the unique file identifier.

32. The method of claim 24, wherein the step of establishing a common file namespace comprises:
  creating a representation of a file that includes transaction records, wherein the transaction records represent changes to the file;
  disassembling the transaction records based upon a desired fault tolerance level; and
  delivering the transaction records to the servers.

33. The method of claim 32, further comprising:
  determining a size of each of the transaction records;
  determining a required degree of file redundancy; and
  determining a minimum functional number of servers for reassembly of the file based upon the desired fault tolerance level.

34. The method of claim 32, wherein the step of disassembling the transaction records comprises:
  disassembling the transaction records into a plurality of file pieces;
  distributing the file pieces to one of the servers; and
  distributing the file pieces to neighboring servers of at least one group so as to achieve the desired fault tolerance level and so that each of the file pieces remains accessible.

35. The method of claim 32, further comprising:
  searching for pieces of the transaction records of the file inside distributed file storage;
  collecting the pieces of the transaction records of the file; and
  assembling the transaction records and the files and storing the assembled files on the client computer.

36. The method of claim 35, wherein the assembling step uses client-side software located on one of the client computers.

37. The method of claim 35, wherein the assembling step uses client-side software located on one of the servers.

38. The method of claim 24, wherein the step of establishing a plurality of servers further comprises:
  tracing changes to files of a client-side file system;
  storing at least some of the changes as transaction records;
  disassembling transaction records into file pieces; and
  distributing the file pieces to the distributed file storage system.

39. The method of claim 38, further comprising:
  if a file requested by the client does not exist in the client-side file system, performing a search to determine whether the requested file is stored in the distributed file storage and download it in case of success;
  if the requested file has been downloaded to the client-side file system, redirecting a file access request to the downloaded file;
  if the requested file is not found in distributed file storage, returning an operating system code denoting that file has not been found; and
  if the requested file exists in the client-side file system, and refreshing contents of the file in the client side file system based on contents of the file in the distributed file storage if any, and redirecting a file access request to the file.

40. The method of claim 39, further comprising verifying a presence of the requested file in the distributed file storage.

41. The method of claim 24, wherein the step of establishing a plurality of servers comprises:
  establishing a fault tolerance level;
  sending transactional file records to client-side software, wherein the transactional file records represent changes to the file;
  disassembling the transactional file records into transactional data file pieces;
  distributing the transactional data file pieces to a server; and
  distributing the data file pieces from the server to neighboring servers so as to achieve a requested fault tolerance level.

42. The method of claim 41, further comprising distributing the data file pieces to servers that are not direct neighbors.

43. The method of claim 41, wherein the step of establishing a fault tolerance level further comprises:
  determining a required degree of redundancy of transactional file records;
  determining a required number of the transactional file records pieces for reassembly; and
  determining a minimum number of functional servers so as to maintain accessibility of all data files in the distributed file storage.

44. The method of claim 41, wherein the step of establishing a fault tolerance level further comprises determining a required degree of redundancy of transactional file records.

45. The method of claim 41, wherein the step of establishing a fault tolerance level further comprises determining a required number of transactional file records pieces for reassembly.

46. The method of claim 41, wherein the step of establishing a fault tolerance level further comprises determining a minimum number of functional servers so as to maintain accessibility of all data files in the distributed file storage.

47. The method of claim 24, wherein the servers are functionally equivalent such that no one server of the N servers used to store the file pieces is different from any other server, for reconstructing the file.

48. The method of claim 24, wherein, to obtain any file from the distributed storage system, the clients can use any of the servers.

49. The method of claim 24, wherein the step of establishing a common file namespace comprises:

representing a file using transaction records, wherein the transaction records represent changes to the file; and delivering the transaction records to the servers.

\* \* \* \* \*